Inventor
CHARLES D. FLORIDA
BY Smart & Biggar
Attorneys.

Aug. 29, 1961 C. D. FLORIDA 2,998,192

COMPUTER REGISTER

Filed Sept. 17, 1959 5 Sheets-Sheet 2

Inventor
CHARLES D. FLORIDA
BY Smart & Biggar
Attorneys.

Inventor
CHARLES D. FLORIDA
By Smart & Biggar
Attorneys.

Inventor
CHARLES D. FLORIDA
BY Smart & Biggar
Attorneys.

Inventor
CHARLES D. FLORIDA
By Smart & Biggar
Attorneys.

United States Patent Office 2,998,192

Patented Aug. 29, 1961

2,998,192

COMPUTER REGISTER

Charles D. Florida, Merivale Gardens, Ontario, Canada, assignor to Her Majesty the Queen in the Right of Canada as represented by the Minister of National Defence Filed Sept. 17, 1959, Ser. No. 840,697

2 Claims. (Cl. 235—164)

The present invention relates to a switching circuit for use in an electronic binary digital computer and to a register for storing data in such a binary digital computer.

In electronic binary digital computers there exists a need for registers to store data. These registers have means for accepting the input data, and for transferring the stored data, either en bloc or in piecemeal fashion, to other parts of the processing machine. If arithmetic operations have to be performed on the data it is helpful if the register can move its stored data, digit by digit, either to the right or to the left, this process being known as shifting. Registers are also used for counting by adding or subtracting one to the number stored in the register.

According to the invention a completely versatile register is provided which can be equipped with facilities to carry out any of the above mentioned operations. Such a register is complex in its structure but leads to a simplification of the design of the computer in which it is used and results in an overall saving in the equipment in the computer. The present invention provides a register which will Shift Right, Shift Left, accept a parallel input, count up, count down, form the one's complement of a stored binary number, can be reset to zero, or can add or subtract three from a number and can shift a number right or left three positions.

According to the present invention a switching circuit comprises first and second input connections, an output connection, an AND gate having first and second input terminals and an output terminal, an INHIBIT gate having a first input terminal, a second inhibit input terminal and an output terminal, and a bi-stable switching element having an "on state" input terminal, and "off state" input terminal and an output terminal. The first input terminal of the AND gate and the first input terminal of the INHIBIT gate are connected to the first input connection, and the second input terminal of the AND gate and the inhibit input of the INHIBIT gate are connected to the second input connection. The output terminal of the AND gate is connected to the "on state" terminal of the bi-stable switching element, whereas the output terminal of the INHIBIT gate is connected to the "off state" input terminal of the bi-stable switching element. The output terminal of the bi-stable switching element is connected to the output connection of the switching circuit.

A plurality of these switching circuits may be combined to form a computer register by connecting the second input connection of each switching circuit to switch means which selectively provides a connection from the second input connection of each switching circuit to one of the following connections; no connection, the output connection of a adjacent switching circuit, the output connection of a switching circuit arranged in the register a predetermined number of positions from each switching circuit, and an external source of input pulses.

In drawings which illustrate embodiments of the invention;

Figure 1:
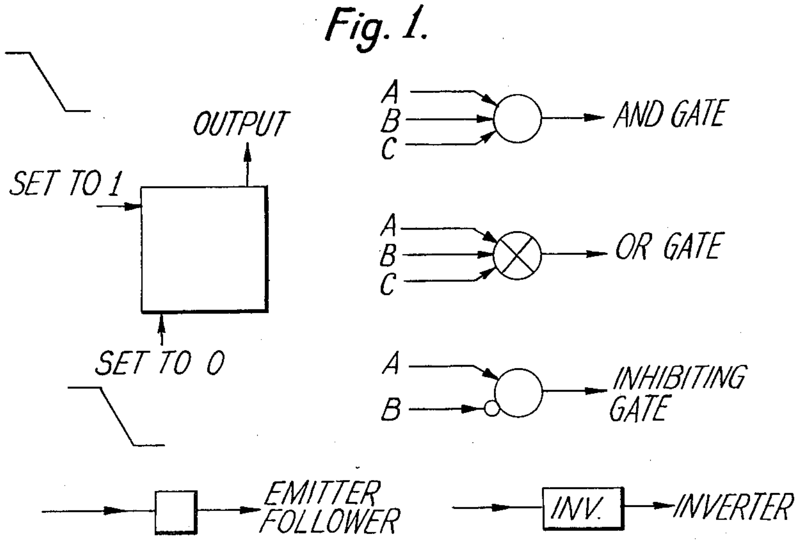
FIGURE 1 shows the symbols used for circuits forming portions of the computer register.

A register according to the invention is formed of components of which the symbols are shown in FIGURE 1. At the left hand side of FIGURE 1 is shown the symbol for a trigger circuit. A negative-going waveform at the SET TO 1 input terminal of the trigger circuit will cause it to switch to the "1" state while a similar waveform applied to the SET TO 0 terminal will cause the trigger circuit to switch to the "0" state. The "1" state corresponds to a voltage of +10 volts and the "0" state to a voltage of 0 volts.

The AND gate is shown at the upper right hand side of FIGURE 1. The output of the AND gate is a "1" only if all its inputs are "1's". The OR gate is shown below the AND gate, the output of the OR gate is a "1" if any or all of its inputs are in the "1" state. Although these gates are shown having 3 inputs the number of inputs can be extended, the same rules being applicable.

The INHIBIT gate shown below the OR gate is more unusual, although it has been used for a number of years. It has the property that a signal capable of switching a trigger circuit is obtained from the output only if the input terminal A switches from "1" to "0" and if the input to terminal B is a zero. The presence of a "1" at terminal B is thus said to inhibit the input at terminal A.

The emitter follower is well known and is used simply as a buffer following each OR gate. The inverter changes an input "0" into a "1" and an input "1" into a "0."

Figures 2, 2A, 3:
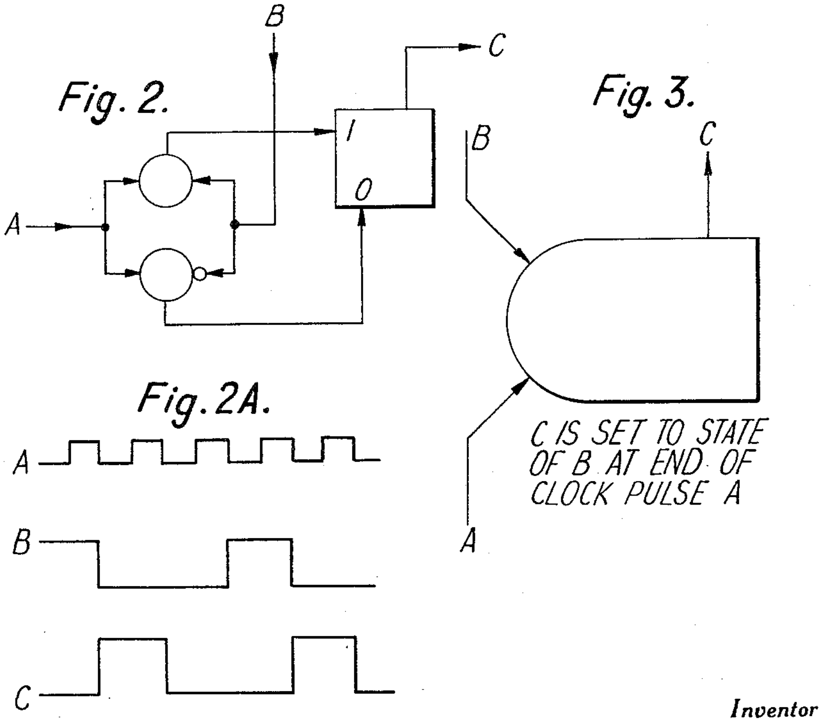
FIGURE 2 is a schematic diagram of the switching circuit using the symbols from FIGURE 1.
FIGURE 2A is a wave form diagram showing the operation of the switching circuit in FIGURE 2.
FIGURE 3 is a symbol for the switching circuit shown in FIGURE 2.

FIGURE 2 shows a switching circuit consisting of a trigger circuit, an AND gate, and an INHIBIT gate, connected together. If it is assumed that the terminal A is driven by a train of clock pulses of unity mark/space ratio and if terminal B is a "1," it inhibits A in the INHIBIT gate so no signal is presented at the set to 0 terminal of the trigger circuit. A signal will be presented to the Set To 1 terminal of the trigger circuit however since A and B are both 1's during the positive portion of the clock pulse. As A returns to zero the AND gate output falls from 1 to 0 giving the required negative going edge.

If terminal B is a 0 no output will be obtained from the AND gate but a signal will be applied to the Set To 0 terminal of the trigger circuit as A changes from 1 to 0. The combination shown in FIGURE 2 therefore has the property that following a clock pulse at terminal A, the trigger circuit assumes the state formerly held by the input at terminal B. This is shown graphically in FIGURE 2A.

Having established what this combination will do, it is unnecessary in what follows to draw the combination in detail. Instead a new symbol, shown in FIGURE 3, will be used.

Figure 4:
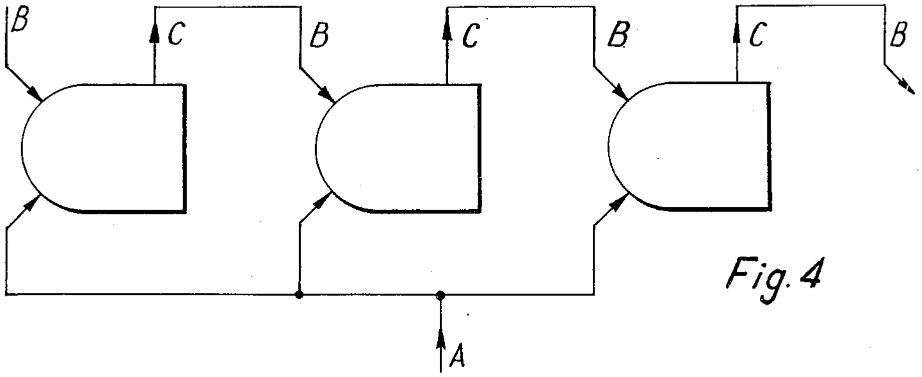
FIGURE 4 shows a plurality of switching circuits connected together to cause the Right Shift of information.
Figure 5:
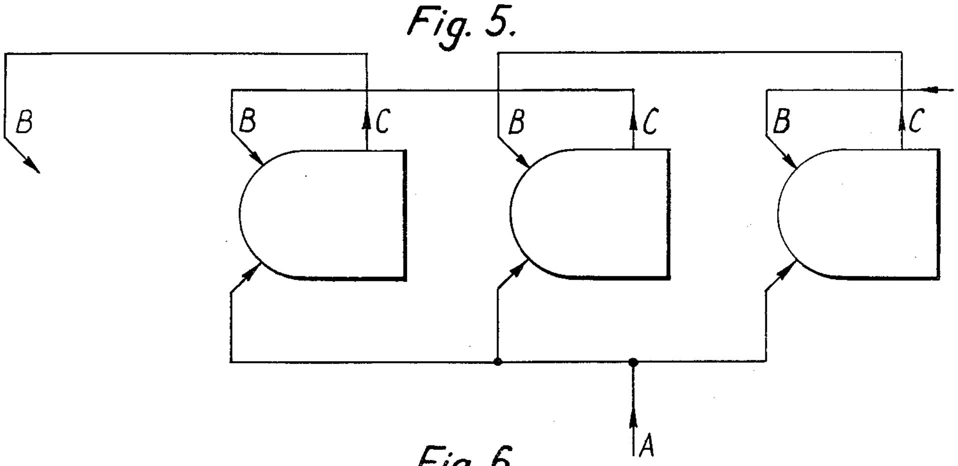
FIGURE 5 shows a plurality of switching circuits interconnected to cause the Left Shift.
Figure 6:
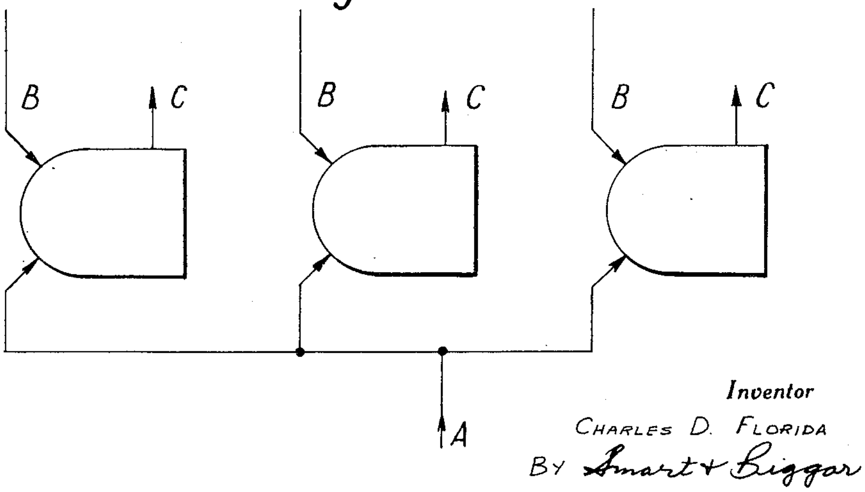
FIGURE 6 shows a plurality of switching circuits whose B-input terminals are connected to an external point.

Terminal B of one switching circuit can be joined to terminal C of another stage and the A terminals joined together and connected to a source of clock pulses as shown in FIGURE 4 to form a register. In this case it can be seen that binary information will be shifted to the right by one digit each time a clock pulse is applied at A since the B terminal of the succeeding stage is set to the state of the B terminal of the preceding stage at the end of each clock pulse. Alternatively, the connections can be reversed as in FIGURE 5. In this case the transfer of binary information is to the left. Another possibility is that each terminal B is joined to a point external to the register, as in FIGURE 6. In this case, after arrival of a clock pulse at A, each stage will possess the state which was impressed upon its B terminal. In other words the parallel transfer of information into the register takes place.

Figure 7:
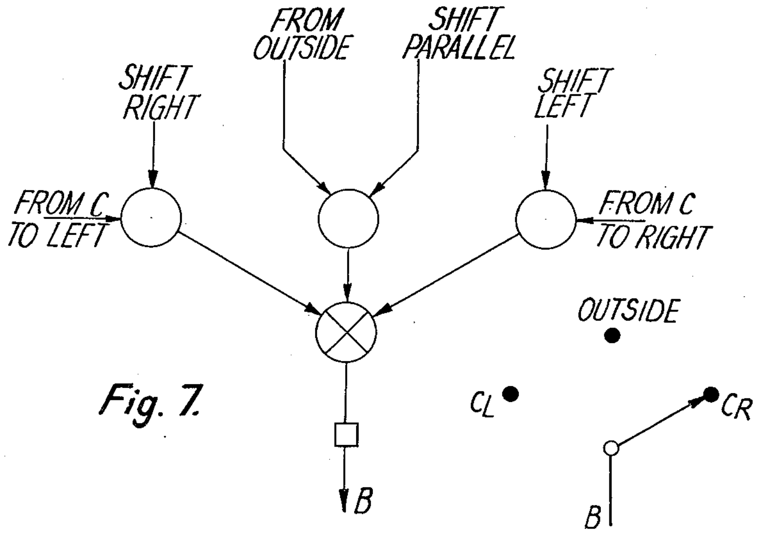
FIGURE 7 shows a gating circuit for providing three ways of shifting information.
Figure 8:
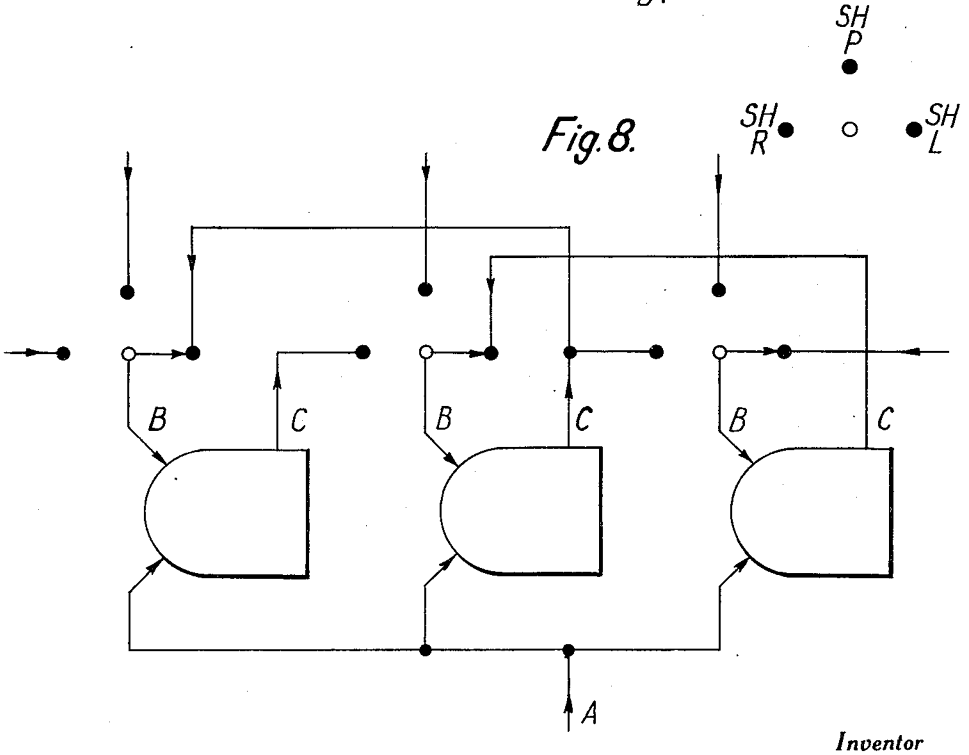
FIGURE 8 shows three stages of a register having the shift facilities provided by the gating circuit of FIGURE 7.

These three ways of shifting information can be merged with a simple combination of AND gates and an OR gate as shown in FIGURE 7. Here the information presented at B can come from three places according whether the shift right, shift parallel, or the shift left control lead is energized. This combination of gates is an electronic switch and is shown as such on the right of the figure. Three stages of a register having these three facilities are shown in FIGURE 8, where the switches are drawn in the shift left position.

Figures 9, 9A:
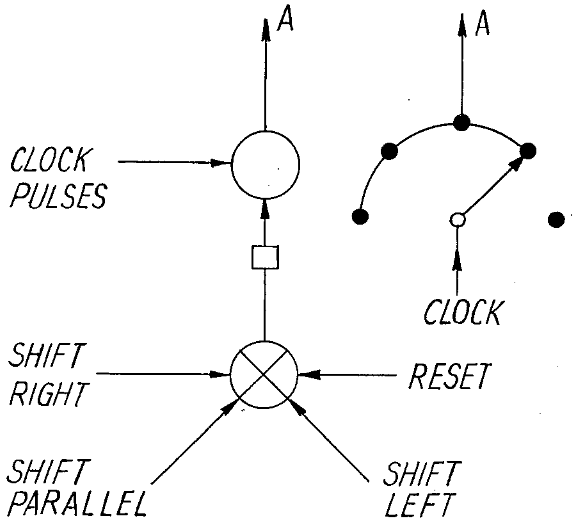
FIGURES 9 and 9A show a gating circuit which includes a reset to zero facility.

Suppose no control lead is energized, as would happen after the desired number of shifts has been attained. This is equivalent to having another position on the switch with zero applied to it. In this case the register would reset to zero on the application of the next clock pulse at A. Resetting to zero is a desired facility but it must be controlled. This can be done by arranging that the clock pulses reach the terminal A only when shifting is required, or when resetting is necessary, and can be accomplished with another simple gating arrangement as shown in FIGURES 9 and 9A.

Figure 10:
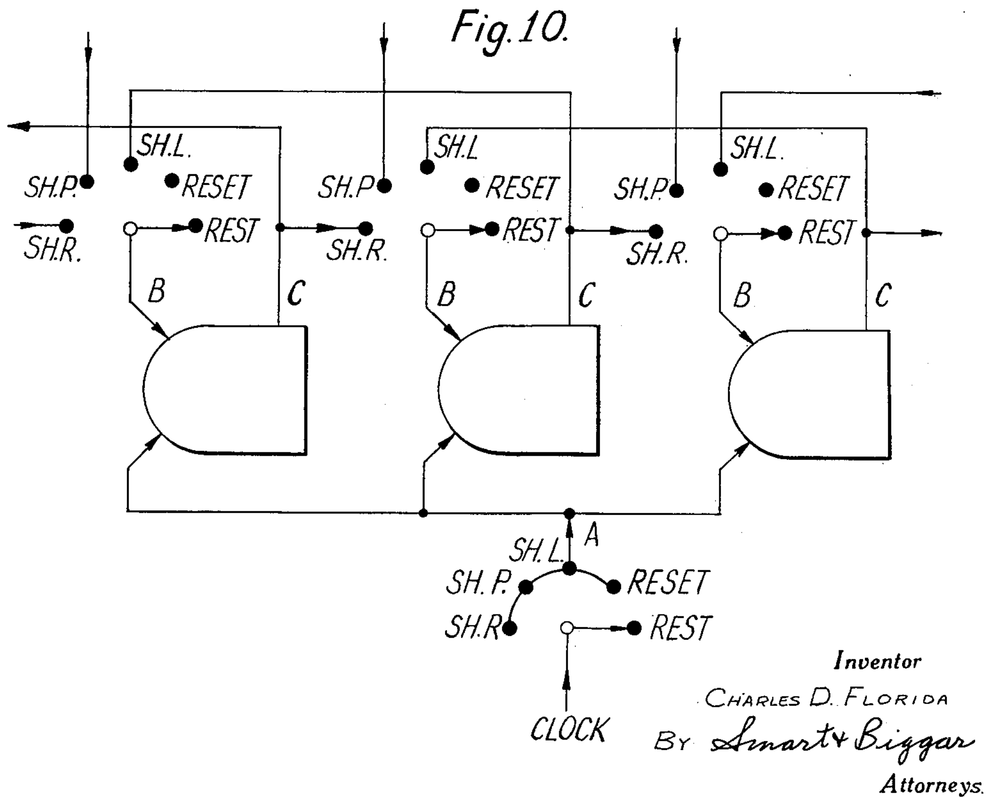
FIGURE 10 shows a register incorporating the gating circuit of FIGURES 9 and 9A.

A register with facilities for left, right and parallel shift and for resetting to zero is shown in FIGURE 10, where the switching is shown in the rest position. Such a register, which may be extended to any number of stages, provides for most of the shifting requirements necessary in electronic binary digital computors. However, it has no counting facility.

Table 1 shows the binary counting table for the first four digits. On the left is shown the sequence when counting up, and on the right the sequence when counting down.

*Table 1*

| Count Up | | Count Down | |
|---|---|---|---|
| Binary | Decimal | Binary | Decimal |
| 0 0 0 0 | 0 | 1 1 1 1 | 15 |
| 0 0 0 1 | 1 | 1 1 1 0 | 14 |
| 0 0 1 0 | 2 | 1 1 0 1 | 13 |
| 0 0 1 1 | 3 | 1 1 0 0 | 12 |
| 0 1 0 0 | 4 | 1 0 1 1 | 11 |
| 0 1 0 1 | 5 | 1 0 1 0 | 10 |
| 0 1 1 0 | 6 | 1 0 0 1 | 9 |
| 0 1 1 1 | 7 | 1 0 0 0 | 8 |
| 1 0 0 0 | 8 | 0 1 1 1 | 7 |
| 1 0 0 1 | 9 | 0 1 1 0 | 6 |
| 1 0 1 0 | 10 | 0 1 0 1 | 5 |
| 1 0 1 1 | 11 | 0 1 0 0 | 4 |
| 1 1 0 0 | 12 | 0 0 1 1 | 3 |
| 1 1 0 1 | 13 | 0 0 1 0 | 2 |
| 1 1 1 0 | 14 | 0 0 0 1 | 1 |
| 1 1 1 1 | 15 | 0 0 0 0 | 0 |

From these sequences rules can be obtained which govern the design of counting registers. When counting up the rules are (*a*) the least significant digit changes on receipt of each incoming count (*b*) any other digit changes state only if all less significant digits were in the 1 state.

When counting down the first rule remains, but the second is altered to read (*b*) any other digit changes state only if all less significant digits were in the zero state.

Figure 11:
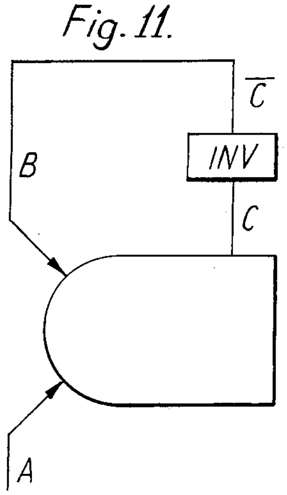
FIGURE 11 shows a switching circuit which changes state after each clock pulse.

A given stage changing state is an important concept when counting, and this is easily accomplished, as shown in FIGURE 11. Here the B terminal of a switching circuit stage is joined to the inverted output from the C terminal of the same stage, so that after arrival of a clock pulse at A the output of the stage is inverted from what it was before. That is, its state is changed. The inverted output is indicated $\overline{C}$ as is conventional in logical arithmetic.

Figure 12:
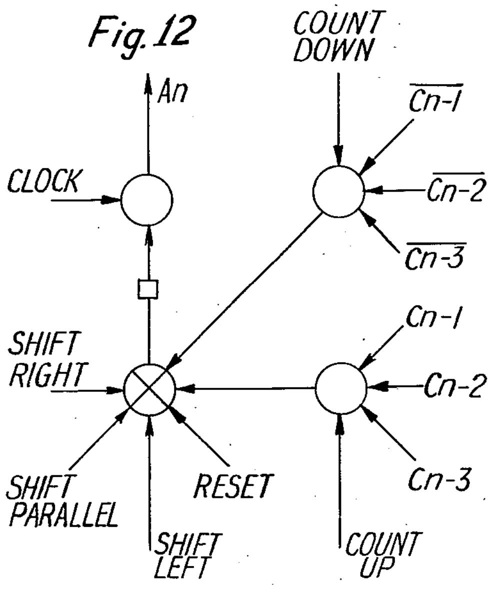
FIGURE 12 shows a gating circuit for use in a register for counting up or counting down.
Figure 12A:
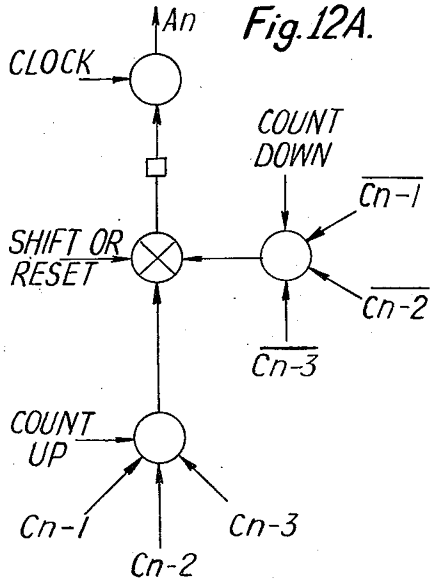
FIGURE 12A shows an alternative gating circuit for FIGURE 12.

For a stage other than the first stage of a register, the stage must be changed only if all previous stages are in the 1 state when counting up, or in the 0 state when counting down. This can be done by an extension to the gating at the terminal $A_n$, the A terminal of the *n*th stage. FIGURE 12 shows the new gating required. Here the counting control leads, either up or down, are gated with the inverted outputs $\overline{C_{n-1}}$, $\overline{C_{n-2}}$, and $\overline{C_{n-3}}$ of the previous stages ($n$–1, $n$–2, $n$–3) so that clock pulses are received at the A terminal of the *n*th stage only if the required conditions are met. In practice, since the shift and reset connections to the OR gate have to be repeated for every stage, it is more economical to merge them separately and then to carry one lead only to each stage. This is shown in FIGURE 12A.

Figures 13, 13A:
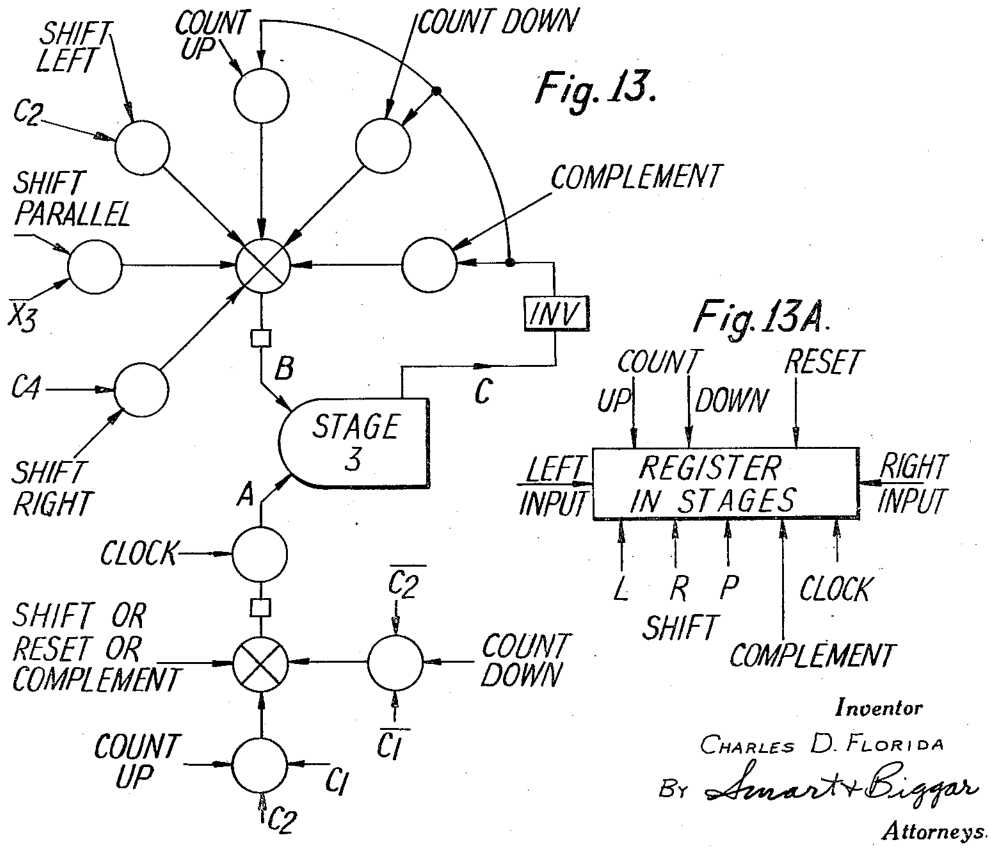
FIGURE 13 is a complete logical diagram for the third stage of a versatile register.
FIGURE 13A is a block diagram of a complete register.

A complete logical diagram for the third stage of a register is shown in FIGURE 13. The complementing function, which is merely changing the state of each stage, is done by applying the inverse of C, $\overline{C}$, to the B terminal of the same stage and applying a single clock pulse.

One stage only is shown in FIGURE 13, so it can be imagined that a complete register would appear complicated. However, a complete *n*-stage register with all facilities appears to the systems designer as another black box as shown in FIGURE 13A. Given such a register, the systems designer has complete flexibility of function so that he can build up whole systems with much less expenditure of effort, time, and money.

Once complete versatility in a register is achieved, other functions can be added if required at very low cost and possibly with great systems advantages.

The facility for adding 3 to and subtracting 3 from a group of 4 binary digits may be readily obtained using the register according to the present invention, since this facility is an example of the count down or count up echnique previously described in connection with FIGJRE 13. Counting up or down by 3 can be accomplished n the same time required to count up or down by one by a light addition to the gating in the register. The gating equirements can be derived as follows. Table II shows he states of four shift register stages before and after 3 s added to or subtracted from the contents.

*Table II*

| Binary+3 | | Decimal | Binary—3 | | Decimal |
|---|---|---|---|---|---|
| Stage | 1 2 3 4 | | Stage | 1 2 3 4 | |
| Before | 0 0 0 0 | 0 | Before | 1 1 1 1 | 15 |
| After | 0 0 1 1 | | After | 1 1 0 0 | |
| Before | 0 0 0 1 | 1 | Before | 1 1 1 0 | 14 |
| After | 0 1 0 0 | | After | 1 0 1 1 | |
| Before | 0 0 1 0 | 2 | Before | 1 1 0 1 | 13 |
| After | 0 1 0 1 | | After | 1 0 1 0 | |
| Before | 0 0 1 1 | 3 | Before | 1 1 0 0 | 12 |
| After | 0 1 1 0 | | After | 1 0 0 1 | |
| Before | 0 1 0 0 | 4 | Before | 1 0 1 1 | 11 |
| After | 0 1 1 1 | | After | 1 0 0 0 | |
| Before | 0 1 0 1 | 5 | Before | 1 0 1 0 | 10 |
| After | 1 0 0 0 | | After | 0 1 1 1 | |
| Before | 0 1 1 0 | 6 | Before | 1 0 0 1 | 9 |
| After | 1 0 0 1 | | After | 0 1 1 0 | |
| Before | 0 1 1 1 | 7 | Before | 1 0 0 0 | 8 |
| After | 1 0 1 0 | | After | 0 1 0 1 | |
| Before | 1 0 0 0 | 8 | Before | 0 1 1 1 | 7 |
| After | 1 0 1 1 | | After | 0 1 0 0 | |
| Before | 1 0 0 1 | 9 | Before | 0 1 1 0 | 6 |
| After | 1 1 0 0 | | After | 0 0 1 1 | |
| Before | 1 0 1 0 | 10 | Before | 0 1 0 1 | 5 |
| After | 1 1 0 1 | | After | 0 0 1 0 | |
| Before | 1 0 1 1 | 11 | Before | 0 1 0 0 | 4 |
| After | 1 1 1 0 | | After | 0 0 0 1 | |
| Before | 1 1 0 0 | 12 | Before | 0 0 1 1 | 3 |
| After | 1 1 1 1 | | After | 0 0 0 0 | |

Examination of the changes in the contents produces the following set of rules for adding 3.

(1) Stage 4 always changes state
(2) Stage 3 changes if stage 4 is "0"
(3) Stage 2 changes if (stage 3 OR stage 4) is "1"
(4) Stage 1 changes if (stage 2 AND stage 3) OR (stage 2 AND stage 4) is "1"

Examination of the column for subtracting 3 will verify the following subtraction rules.

(1) Stage 4 always changes state
(2) Stage 3 changes if stage 4 is "1"
(3) Stage 2 changes if (stage 3 OR stage 4) is "0"
(4) Stage 1 changes if (stage 2 AND stage 3) OR (stage 2 AND stage 4) is "0."

The gating required to carry out the addition or subtraction of three can readily be obtained by using these two sets of rules. For example, the count up gate for adding three connected to the third stage of a register similar to the gate for adding one connected to the third stage of the register shown in FIGURE 13 would now have applied thereto the $\overline{C_4}$ output of the fourth stage of the register instead of the $C_2$ and $C_1$ outputs of the first and second stages as shown in FIGURE 13. Further, the count down gate for decreasing the count by three connected to the third stage, a register similar to the gate for subtracting one connected to the third stage of FIGURE 13, would now have applied thereto the $C_4$ output from the fourth stage instead of the $\overline{C_1}$, $\overline{C_2}$ outputs from the first and second stages as shown in FIGURE 13. The connections for the gates for adding and subtracting three just described in connection with the third stage of the register conform to both sections (2) immediately above. The connections for the remaining gates for adding or subtracting three connected to stages 1, 2 and 4 may readily be determined by applying the above rules.

It should be noted that the gates for modifying the count by three may be employed either in addition to or in place of the count down or count up gates which change the value in the register by one shown in FIGURE 13.

What I claim as my invention is:

1. A computer register for a binary digital computer comprising a plurality of switching circuits; each of said switching circuits comprising first and second input connections, an output connection, an AND gate having first and second input terminals and an output terminal, an INHIBIT gate having a first input terminal, a second inhibit input terminal and an output terminal, and a bi-stable switching element having an "on state" input terminal, an "off state" input terminal and an output terminal, the first input terminal of the AND gate and the first input terminal of the INHIBIT gate being connected to the first input connection, the second input terminal of the AND gate and the inhibit input of the INHIBIT gate being connected to the second input connection, the output terminal of the AND gate being connected to the "on state" terminal of the bistable switching element, the output terminal of said INHIBIT gate being connected to the "off state" input terminal of the bi-stable switching element, and the output terminal of said bi-stable switching element being connected to the output connection of said switching circuit; said switching circuits being arranged in a linear sequence, the first input connections of said switching circuits being connected together, the second input connection of each switching circuit being connected to switch means, said switch means selectively providing a connection from said second input connection of each switching circuit to one of the following connections: no connection, the output connection of an adjacent switching circuit, the output connection of a switching circuit arranged in said register a predetermined number of positions from each switching circuit, and an external source of input pulses.

2. A computer register for a binary digital computer comprising a plurality of switching circuits; each of said switching circuits comprising first and second input connections, an output connection, an AND gate having first and second input terminals and an output terminal, an INHIBIT gate having a first input terminal, a second inhibit input terminal and an output terminal, and a bi-stable switching element having an "on state" input terminal, an "off state" input terminal and an output terminal, the first input terminal of the AND gate and the first input terminal of the INHIBIT gate being connected to the first input connection, the second input terminal of the AND gate and the inhibit input of the INHIBIT gate being connected to the second input connection, the output terminal of the AND gate being connected to the "on state" terminal of the bi-stable switching element, the output terminal of said INHIBIT gate being connected to the "off state" input terminal of the bi-stable switching element, and the output terminal of said bi-stable switching element being connected to the output connection of said switching circuit; said switching circuits being arranged in a linear sequence, the second input connection of each switching circuit being connected to switch means, said switch means selectively providing a connection from said second input connection of each switching circuit to one of the following connections: no connection, the output connection of an adjacent switching circuit, the output connection of a switching circuit arranged in said register a predetermined number of positions from each switching circuit, and an external source of input pulses; an AND gate, an OR gate, a CONTROL gate for each of the first input connections of said switching circuits; a source of clock pulses; each of the first input connections of said switching circuits being connected through its respective AND gate to the source of clock pulses and to an OR gate, each OR gate having an input connection to the output of at least one control gate.

References Cited in the file of this patent

UNITED STATES PATENTS

| | | |
|---|---|---|
| 2,750,114 | Crosman | June 12, 1956 |
| 2,754,059 | Wilcox | July 10, 1956 |
| 2,860,327 | Campbell | Nov. 11, 1958 |